United States Patent
Zou

(10) Patent No.: US 10,198,282 B2
(45) Date of Patent: Feb. 5, 2019

(54) CONTROLLING A VM MIGRATION TO A DESTINATION HOST BASED ON RESOURCE AVAILABILITY AND A TYPE OF APPLICATION RUNNING ON THE VM

(71) Applicant: Huawei Technologies Co., Ltd., Shenzhen (CN)

(72) Inventor: Tao Zou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 154 days.

(21) Appl. No.: 15/260,409

(22) Filed: Sep. 9, 2016

(65) Prior Publication Data

US 2016/0378537 A1 Dec. 29, 2016

Related U.S. Application Data

(63) Continuation of application No. PCT/CN2014/090323, filed on Nov. 5, 2014.

(30) Foreign Application Priority Data

Mar. 12, 2014 (CN) .......................... 2014 1 0091247

(51) Int. Cl.
*G06F 9/455* (2018.01)
*G06F 9/48* (2006.01)

(52) U.S. Cl.
CPC ........ *G06F 9/45558* (2013.01); *G06F 9/4856* (2013.01); *G06F 2009/4557* (2013.01)

(58) Field of Classification Search
CPC ......... G06F 2009/4557; G06F 9/45558; G06F 9/4856

See application file for complete search history.

(56) References Cited

U.S. PATENT DOCUMENTS 8,209,687 B2 * 6/2012 Yuyitung ............... G06Q 10/06
  718/1
9,052,935 B1 * 6/2015 Rajaa .................... G06F 9/5033
  (Continued)

FOREIGN PATENT DOCUMENTS

CN 102609808 A 7/2012
CN 102662751 A 9/2012
  (Continued)

OTHER PUBLICATIONS

Machine Translation and Abstract of Chinese Publication No. CN102609808, Part 1, Jul. 25, 2012, 11 pages.
(Continued)

*Primary Examiner* — Eric C Wai
*Assistant Examiner* — Jorge A Chu Joy-Davila
(74) *Attorney, Agent, or Firm* — Conley Rose, P.C.

(57) ABSTRACT

A method and an apparatus for controlling virtual machine migration is presented, where the method includes obtaining information about an application running on a first virtual machine, where the first virtual machine runs on a first host; determining, according to the information about the application, whether an application associated with the application running on the first virtual machine runs on a second virtual machine, where the second virtual machine is any virtual machine running on a second host; and if no application associated with the application running on the first virtual machine runs on the second virtual machine, migrating the first virtual machine to the second host. The embodiments of the present disclosure can ensure that reliability of an application is not affected during a virtual machine migration process.

2 Claims, 4 Drawing Sheets

(56) References Cited

U.S. PATENT DOCUMENTS

| | | | |
|---|---|---|---|
| 2006/0195715 A1* | 8/2006 | Herington | G06F 9/5077 714/4.2 |
| 2009/0070771 A1* | 3/2009 | Yuyitung | G06Q 10/06 718/105 |
| 2011/0214005 A1* | 9/2011 | Biran | G06F 11/008 714/1 |
| 2012/0030670 A1* | 2/2012 | Vijay | G06F 9/45558 718/1 |
| 2013/0007272 A1* | 1/2013 | Breitgand | G06F 9/5077 709/224 |
| 2013/0097464 A1* | 4/2013 | Ahmad | G06F 9/45558 714/47.1 |
| 2013/0185667 A1 | 7/2013 | Harper et al. | |
| 2013/0198740 A1* | 8/2013 | Arroyo | H04L 41/0806 718/1 |
| 2013/0227558 A1* | 8/2013 | Du | G06F 9/45558 718/1 |
| 2013/0254261 A1* | 9/2013 | Nicholls | G06F 9/5027 709/203 |
| 2014/0068077 A1* | 3/2014 | Hadad | G06F 9/5027 709/226 |
| 2017/0359270 A1* | 12/2017 | Buil | H04L 67/1097 |

FOREIGN PATENT DOCUMENTS

| | | | |
|---|---|---|---|
| CN | 103077079 A | | 5/2013 |
| WO | 2013075640 A | | 5/2013 |
| WO | 2014014479 A1 | | 1/2014 |

OTHER PUBLICATIONS

Machine Translation and Abstract of Chinese Publication No. CN102609808, Part 2, Jul. 25, 2012, 3 pages.

Machine Translation and Abstract of Chinese Publication No. CN103077079, Part 1, May 1, 2013, 9 pages.

Machine Translation and Abstract of Chinese Publication No. CN103077079, Part 2, May 1, 2013, 3 pages.

Foreign Communication From a Counterpart Application, European Application No. 14885161.1, Extended European Search Report dated Feb. 8, 2017, 8 pages.

Foreign Communication From a Counterpart Application, PCT Application No. PCT/CN2014/090323, English Translation of International Search Report dated Jan. 14, 2015, 2 pages.

Foreign Communication From a Counterpart Application, PCT Application No. PCT/CN2014/090323, English Translation of Written Opinion dated Jan. 14, 2015, 8 pages.

Machine Translation and Abstract of Chinese Publication No. CN102662751, Sep. 12, 2012, 11 pages.

Foreign Communication From a Counterpart Application, Chinese Application No. 201410091247.9, Chinese Office Action dated Oct. 9, 2017, 8 pages.

* cited by examiner

CONTROLLING A VM MIGRATION TO A DESTINATION HOST BASED ON RESOURCE AVAILABILITY AND A TYPE OF APPLICATION RUNNING ON THE VM

CROSS-REFERENCE TO RELATED APPLICATIONS

This application is a continuation application of International Application No. PCT/CN2014/090323 filed on Nov. 5, 2014, which claims priority to Chinese Patent Application No. 201410091247.9 filed on Mar. 12, 2014, both of which are incorporated by reference.

TECHNICAL FIELD

Embodiments of the present disclosure relate to the field of computer technologies, and in particular, to a method and an apparatus for controlling virtual machine migration.

BACKGROUND

In a virtualization technology, a virtual layer is added between software and hardware to virtualize a physical machine (PM) at a bottom layer into multiple virtual machines (VM), and all virtual machines are centrally scheduled using the virtual layer to implement multiplexing of the physical machine. Virtual machine migration is a main feature of the virtualization technology. The virtual machine migration refers to that a virtual machine of two or more physical hosts is migrated between the physical hosts, that is, an operating system and memory data of the virtual machine, and a status of the virtual machine are transferred in a case of ensuring that an application is not interrupted, which features zero downtime, and can ensure full utilization of hardware resources on different physical platforms and improve the operating efficiency of a system.

Current migration processing of a virtual machine is generally considered from a hardware (for example, a memory or a network) perspective. For example, there is a double-machine application A. In an original situation, a master machine and a slave machine of the double-machine application A run on a VM A and a VM B respectively, and the VM A and the VM B run on a physical machine PM A and a physical machine PM B respectively. When the PM A is abnormal, an active/standby mechanism is enabled, and the VM A running on the PM A is migrated to the PM B by means of a virtual machine migration operation. In this case, both the VM A and the VM B run on the PM B. If the PM B becomes abnormal, the active/standby mechanism cannot be enabled, which reduces reliability of the application. Similarly, when the application is a cluster application, a similar problem also exists. If multiple VMs in a same cluster exist on one PM after migration is performed, the reliability of the application is also reduced. Therefore, it is necessary to provide a new method to resolve the foregoing problem.

SUMMARY

Embodiments of the present disclosure provide a method and an apparatus for controlling virtual machine migration, which can ensure that reliability of an application is not affected during a virtual machine migration process.

A first aspect of the embodiments of the present disclosure provides an apparatus for controlling virtual machine migration, including an obtaining unit configured to obtain information about an application running on a first virtual machine, and send the information to a determining unit, where the first virtual machine runs on a first host; the determining unit configured to receive the information that is about the application running on the first virtual machine and that is sent by the obtaining unit, and determine, according to the information about the application, whether an application associated with the application running on the first virtual machine runs on a second virtual machine, and send a result of the determining to a migration control unit, where the second virtual machine is any virtual machine running on a second host; and the migration control unit configured to receive the result of the determining sent by the determining unit, and when the result of the determining is that no application associated with the application running on the first virtual machine runs on the second host, migrate the first virtual machine to the second host.

With reference to the first aspect of the embodiments of the present disclosure, in a first implementation manner of the first aspect of the embodiments of the present disclosure, the information that is about the application running on the first virtual machine and that is obtained by the obtaining unit includes a type of the application, where the type of the application includes ordinary, double-machine, or cluster.

With reference to the first implementation manner of the first aspect of the embodiments of the present disclosure, in a second implementation manner of the first aspect of the embodiments of the present disclosure, the determining unit includes a first determining unit configured to, when the type of the application running on the first virtual machine is ordinary, determine that no application associated with the application running on the first virtual machine runs on the second virtual machine.

With reference to the first implementation manner of the first aspect of the embodiments of the present disclosure, in a third implementation manner of the first aspect of the embodiments of the present disclosure, when the type of the application running on the first virtual machine is double-machine or cluster, the information about the application further includes an identifier of the application; and the determining unit includes a second determining unit configured to, when the type of the application running on the first virtual machine is double-machine or cluster, determine whether an identifier, matching the identifier of the application running on the first virtual machine, of an application running on the second virtual machine exists, and when the identifier does not exist, determine that no application associated with the application running on the first virtual machine runs on the second virtual machine.

With reference to the first aspect of the embodiments of the present disclosure, the first implementation manner of the first aspect, the second implementation manner of the first aspect, or the third implementation manner of the first aspect, in a fourth implementation manner of the first aspect of the embodiments of the present disclosure, the apparatus further includes a detection unit configured to detect a remaining resource amount of the second host, and send a detection result to a trigger unit; and the trigger unit configured to receive the detection result sent by the detection unit, and when the detection result is that the remaining resource amount of the second host is greater than or equal to a preset threshold, trigger the obtaining unit to obtain the information about the application running on the first virtual machine.

A second aspect of the embodiments of the present disclosure provides a method for controlling virtual machine migration, including obtaining information about an application running on a first virtual machine, where the first virtual machine runs on a first host; determining, according to the information about the application, whether an application associated with the application running on the first virtual machine runs on a second virtual machine, where the second virtual machine is any virtual machine running on a second host; and when no application associated with the application running on the first virtual machine runs on the second virtual machine, migrating the first virtual machine to the second host.

With reference to the second aspect of the embodiments of the present disclosure, in a first implementation manner of the second aspect of the embodiments of the present disclosure, the information about the application running on the first virtual machine includes a type of the application, where the type of the application includes ordinary, double-machine, or cluster.

With reference to the first implementation manner of the second aspect of the embodiments of the present disclosure, in a second implementation manner of the second aspect of the embodiments of the present disclosure, the determining, according to the information about the application, whether an application associated with the application running on the first virtual machine runs on the second virtual machine includes, when the type of the application running on the first virtual machine is ordinary, determining that no application associated with the application running on the first virtual machine runs on the second virtual machine.

With reference to the first implementation manner of the second aspect of the embodiments of the present disclosure, in a third implementation manner of the second aspect of the embodiments of the present disclosure, the determining, according to the information about the application, whether an application associated with the application running on the first virtual machine runs on the second virtual machine includes, when the type of the application running on the first virtual machine is double-machine or cluster, and the information about the application further includes an identifier of the application, determining whether an identifier, matching the identifier of the application running on the first virtual machine, of an application running on the second virtual machine exists; and when the identifier does not exist, determining that no application associated with the application running on the first virtual machine runs on the second virtual machine.

With reference to the second aspect of the embodiments of the present disclosure, the first implementation manner of the second aspect, the second implementation manner of the second aspect, or the third implementation manner of the second aspect, in a fourth implementation manner of the second aspect of the embodiments of the present disclosure, before obtaining information about an application running on a first virtual machine, the method further includes detecting a remaining resource amount of the second host; and when the remaining resource amount of the second host is greater than or equal to a preset threshold, triggering the step of obtaining information about an application running on a first virtual machine.

It can be seen from the foregoing technical solutions that the embodiments of the present disclosure have the following advantages.

In the embodiments of the present disclosure, information about an application running on a first virtual machine is first obtained, where the first virtual machine runs on a first host; it is determined, according to the information about the application, whether an application associated with the application running on the first virtual machine runs on a second virtual machine, where the second virtual machine is any virtual machine running on a second host; and if no application associated with the application running on the first virtual machine runs on the second virtual machine, the first virtual machine is migrated to the second host. In the embodiments of the present disclosure, before the first virtual machine is migrated to the second host, it is first determined whether an application associated with the application running on the first virtual machine runs on all the virtual machines running on the second host, and if no application associated with the application running on the first virtual machine runs on all the virtual machines running on the second host, virtual machine migration is performed. Therefore, different virtual machines on which an associated application runs are prevented from running on a same host after migration is performed, and reliability of an original application after the migration is performed is ensured.

BRIEF DESCRIPTION OF DRAWINGS

To describe the technical solutions in the embodiments of the present disclosure more clearly, the following briefly describes the accompanying drawings required for describing the embodiments or the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

The following describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The embodiments of the present disclosure provide a method and an apparatus for controlling virtual machine migration, which can ensure that reliability of an application is not affected during a virtual machine migration process.

Figure 1:
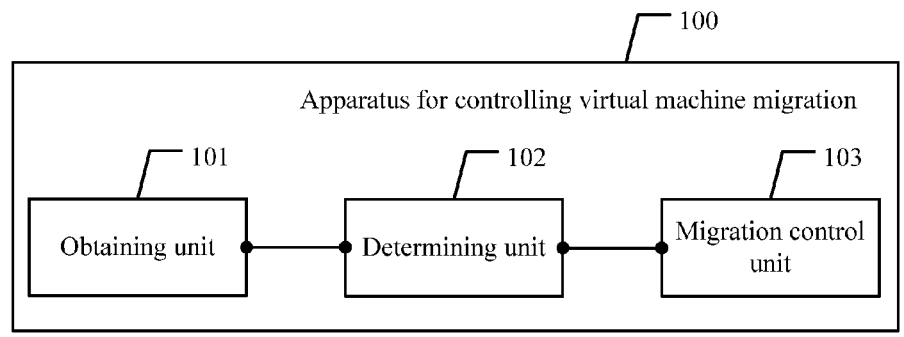
FIG. 1 is a schematic diagram of an embodiment of an apparatus for controlling virtual machine migration according to the present disclosure.

Referring to FIG. 1, FIG. 1 is a schematic diagram of an embodiment of an apparatus for controlling virtual machine migration according to the present disclosure. An apparatus 100 for controlling virtual machine migration in this embodiment includes an obtaining unit 101 configured to obtain information about an application running on a first virtual machine, and send the information to a determining unit 102, where the first virtual machine runs on a first host;

the determining unit 102 configured to receive the information that is about the application running on the first virtual machine and that is sent by the obtaining unit 101, and determine, according to the information about the application, whether an application associated with the application running on the first virtual machine runs on a second virtual machine, and send a result of the determining to a migration control unit 103, where the second virtual machine is any virtual machine running on a second host; and the migration control unit 103 configured to receive the result of the determining sent by the determining unit 102, and when the result of the determining is that no application associated with the application running on the first virtual machine runs on the second virtual machine, migrate the first virtual machine to the second host.

A host mentioned in this embodiment refers to a computer in which virtualization software is used. The computer has a virtual layer because of use of the virtualization software, and multiple virtual machines may run on one host. The host provides resources used by a virtual machine, such as a central processing unit (CPU) and a memory, and allows that the virtual machine can access a memory and a network.

In this embodiment, the first virtual machine runs on the first host, and another virtual machine may further run on the first host. Some applications may run on the first virtual machine. If an application runs on the first virtual machine, the obtaining unit 101 obtains the application running on the first virtual machine.

One or more virtual machines may run on the second host, any virtual machine running on the second host is referred to as the second virtual machine herein. That is, the first virtual machine refers to a virtual machine running on the first host, and the second virtual machine refers to any virtual machine running on the second host, where there are one or more second virtual machines. Some applications may also run on the second virtual machine. The obtaining unit 101 may obtain information about an application running on the second virtual machine and send the information to the determining unit 102, and the determining unit 102 determines whether an application associated with the application running on the first virtual machine runs on the second virtual machine.

If a result of the determining is that the application running on the second virtual machine is not associated with the application running on the first virtual machine, it indicates that after the first virtual machine is migrated to the second host, reliability of the application that originally runs on the first virtual machine is not affected by the migration. In this case, if the first host becomes faulty, or another case in which the first virtual machine needs to be migrated occurs, the migration control unit 103 may migrate the first virtual machine to the second host. If the result of the determining is that the application running on the second virtual machine is associated with the application running on the first virtual machine, it indicates that after the first virtual machine is migrated to the second host, the reliability of the application that originally runs on the first virtual machine is affected by the migration, and then the first virtual machine is rejected to be migrated to the second host.

In addition, if no application runs on the first virtual machine, the migration control unit 103 may directly migrate the first virtual machine to the second host when there is a need.

In this embodiment, before a migration control unit migrates a first virtual machine to a second host, a determining unit first determines whether an application associated with an application running on the first virtual machine runs on all virtual machines running on the second host, and if no application associated with the application running on the first virtual machine runs on all the virtual machines running on the second host, the migration control unit performs virtual machine migration. Therefore, different virtual machines on which an associated application runs are prevented from running on a same host after migration is performed, and reliability of an original application after the migration is performed is ensured.

Figure 2:
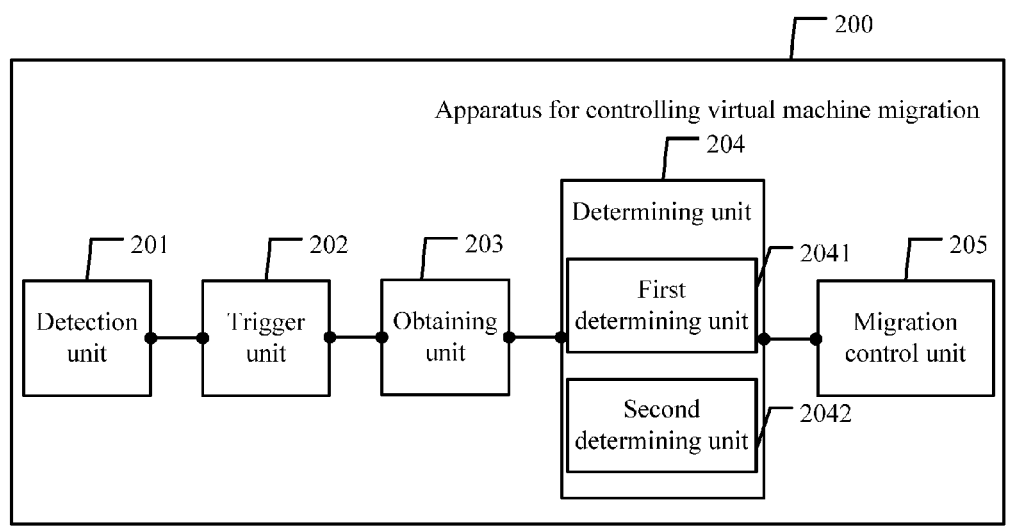
FIG. 2 is a schematic diagram of another embodiment of an apparatus for controlling virtual machine migration according to the present disclosure.

For ease of understanding, the following describes, using a specific example, an apparatus for controlling virtual machine migration in an embodiment of the present disclosure. Referring to FIG. 2, an apparatus 200 for controlling virtual machine migration in an embodiment includes a detection unit 201 configured to detect a remaining resource amount of a second host, and send a detection result to a trigger unit 202; the trigger unit 202 configured to receive the detection result sent by the detection unit 201, and when the detection result is that the remaining resource amount of the second host is greater than or equal to a preset threshold, trigger an obtaining unit 203 to obtain information about an application running on a first virtual machine; the obtaining unit 203 configured to obtain the information about the application running on the first virtual machine, and send the information to a determining unit 204, where the first virtual machine runs on a first host; the determining unit 204 configured to receive information that is about the application running on the first virtual machine and that is sent by the obtaining unit 203, and determine, according to the information about the application, whether an application associated with the application running on the first virtual machine runs on a second virtual machine, and send a result of the determining to a migration control unit 205, where the second virtual machine is any virtual machine running on the second host; and the migration control unit 205 configured to receive the result of the determining sent by the determining unit 204, and when the result of the determining is that no application associated with the application running on the first virtual machine runs on the second virtual machine, migrate the first virtual machine to the second host.

The determining unit 204 includes a first determining unit 2041 and a second determining unit 2042, where the first determining unit 2041 is configured to, when a received type of the application running on the first virtual machine is ordinary, determine that no application associated with the application running on the first virtual machine runs on the second virtual machine; and the second determining unit 2042 is configured to, when the received type of the application running on the first virtual machine is double-machine or cluster, determine whether an identifier, matching an identifier of the application running on the first virtual machine, of an application running on the second virtual machine exists, and if the identifier does not exist, determine that no application associated with the application running on the first virtual machine runs on the second virtual machine.

For further understanding of the apparatus 200 for controlling virtual machine migration in this embodiment, the following describes, using an actual application scenario, an interactive manner between units of the apparatus 200 for controlling virtual machine migration in this embodiment.

In this embodiment, the apparatus 200 for controlling virtual machine migration may control multiple virtual machines on multiple hosts to be migrated between the hosts, where the multiple hosts include the first host and the second host; the first virtual machine refers to a virtual machine running on the first host, and another virtual machine may further run on the first host; and the second host refers to any virtual machine running on the second host.

When the first virtual machine on the first host needs to be migrated to the second host, the detection unit 201 detects a resource usage amount of the second host, where the resources may include a memory, a network, and the like; determines whether the remaining resource amount of the second host is greater than or equal to the preset threshold, and sends a detection result to the trigger unit 202, where the preset threshold may be preset by the detection unit 201 according to a resource usage amount of an application running on a virtual machine that needs to be migrated.

If the detection result received by the trigger unit 202 is that the remaining resource amount of the second host is greater than or equal to the preset threshold, it indicates that the second host may satisfy a migration requirement of the first virtual machine from a hardware perspective. Whether the first virtual machine may be migrated to the second host further needs to be determined by the determining unit 204 from an application perspective. The obtaining unit 203 obtains the information about the application running on the first virtual machine.

The information about the application includes a type of the application, and the type of the application includes ordinary, double-machine, or cluster. In addition, when the type of the application is double-machine or cluster, the information about the application further includes an identifier of the application. The identifier of the application includes an application name, a node identifier, and the like. An application of an ordinary type exists independently, and is not associated with another application. For an application of a double-machine type, applications are associated with each other, and may be identified using an application name (used to determine whether the applications are a same double-machine application) and a node identifier (for example, Master or Slave). Initially, associated applications run on virtual machines of two different hosts. Similarly, when an application is a cluster application, applications are also associated with each other, and may be identified using an application name (used to determine whether the applications are a same cluster application) and a node identifier (for example, a Node1$d$, a Node2$d$, or a Node3$d$). Initially, associated applications run on virtual machines of multiple different hosts. For an application of a double-machine type and an application of a cluster type, it is considered that identifiers of two applications match each other only when both application names and node identifiers match each other, where the matching herein refers to being the same or corresponding.

The determining unit 204 determines whether an application associated with the application running on the first virtual machine runs on the second virtual machine, where when a type, obtained by the obtaining unit 203, of the application running on the first virtual machine is ordinary, it indicates that the application exists independently, and the first determining unit 2041 determines that no application associated with the application runs on all second virtual machines, that is, performing migration on the first virtual machine does not affect reliability of the application running on the first virtual machine; the second host may serve as a protection host of the first virtual machine running on the first host; when the first host becomes faulty, or the first virtual machine needs to be migrated in another situation, the migration control unit 205 may migrate the first virtual machine to the second host.

When the type, obtained by the obtaining unit 203, of the application running on the first virtual machine is double-machine or cluster, when migration on the first virtual machine is being performed, for the second determining unit 2042, a reliability problem of the application that originally runs on the first virtual machine after the migration is performed needs to be considered. The second determining unit 2042 determines whether the identifier of the application running on the second virtual machine matches the identifier of the application running on the first virtual machine. If the identifier of the application running on the second virtual machine does not match the identifier of the application running on the first virtual machine, the second determining unit 2042 determines that no application associated with the application running on the first virtual machine runs on the second virtual machine. When there is a need, the migration control unit 205 may migrate the first virtual machine to the second host. If an identifier of any application running on a virtual machine on the second host matches the identifier of the application running on the first virtual machine, it indicates that after the first virtual machine is migrated to the second host, different virtual machines on which an associated application runs run on the second host. Migrating the first virtual machine to the second host affects the reliability of the application that originally runs on the first virtual machine. Considering from an application perspective, the second host is not suitable for serving as a protection host of the first virtual machine. The migration control unit 205 rejects to migrate the first virtual machine to the second host.

In this embodiment, when a migration control unit needs to migrate a first virtual machine to a second host, a detection unit and a trigger unit first determine, from a hardware perspective, whether the second host satisfies a migration condition, and then a determining unit determines, from an application perspective, whether the second host satisfies the migration condition. Only when a remaining resource amount of the second host satisfies a preset condition, and no application associated with an application running on the first virtual machine runs on all virtual machines on the second host, the migration control unit migrates the first virtual machine to the second host. Therefore, different virtual machines on which an associated application runs are prevented from running on a same host after migration is performed, and reliability of an original application after the migration is performed is ensured.

Figure 3:
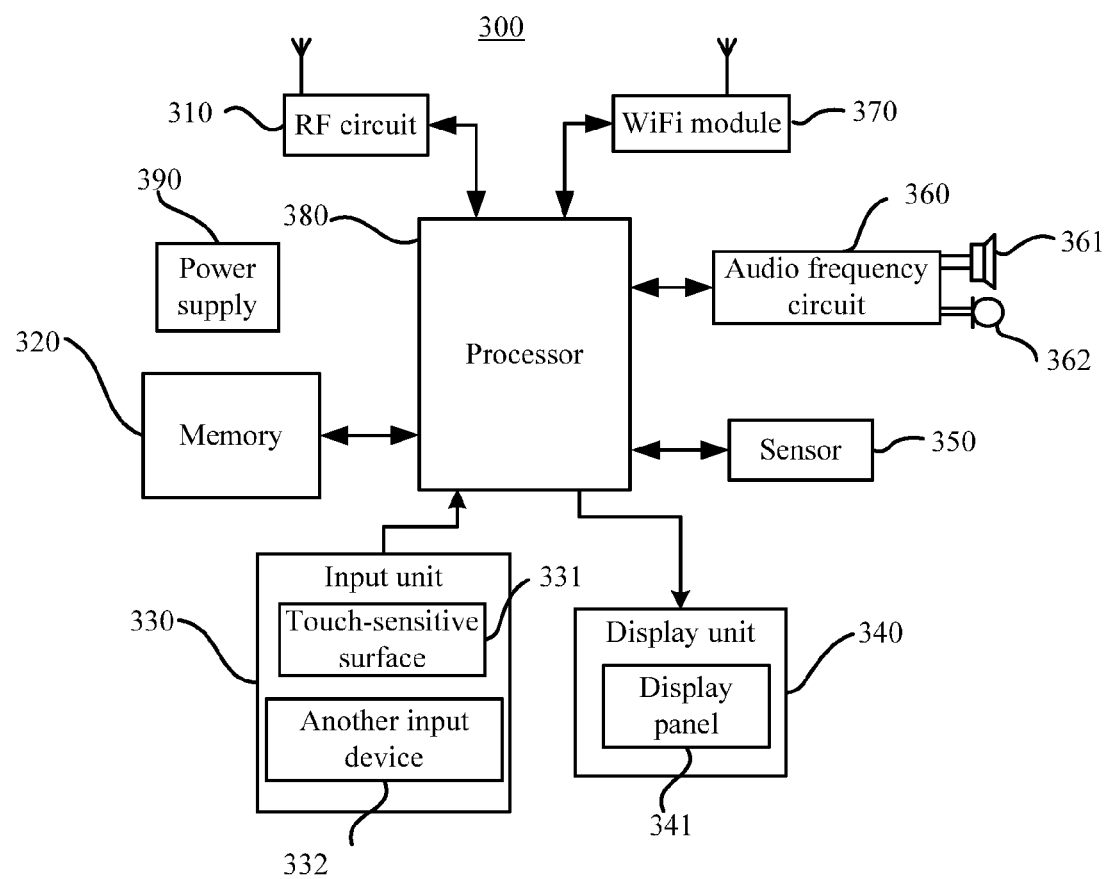
FIG. 3 is a schematic diagram of another embodiment of an apparatus for controlling virtual machine migration according to the present disclosure.

The following further describes an apparatus for controlling virtual machine migration according to an embodiment of the present disclosure. Referring to FIG. 3, details are as follows.

An apparatus 300 for controlling virtual machine migration may include parts such as a radio frequency (RF) circuit 310, a memory 320 including one or more computer-readable storage media, an input unit 330, a display unit 340, a sensor 350, an audio frequency circuit 360, a WiFi module 370, a processor 380 including one or more processing cores, and a power supply 390. A person skilled in the art may understand that a structure shown in FIG. 3 does not constitute any limitation to the apparatus 300, and may include more or less parts than those shown in the figure, or a combination of some parts, or parts disposed differently.

The RF circuit 310 may be configured to receive and send a signal in a message receiving or sending process, and in particular, after receiving downlink information of a base station, send the downlink information to one or more processors 380 to perform processing; and in addition, send uplink data to the base station. Generally, the RF circuit 310 includes but is not limited to an antenna, at least one amplifier, a tuner, one or more oscillators, a subscriber identity module (SIM) card, a transceiver, a coupler, a low noise amplifier (LNA), and a duplexer. In addition, the RF circuit 310 may further communicate with a network and another device by means of radio communication. Any communications standard or protocol may be used for the radio communication, including but not limited to a Global System for Mobile Communications (GSM), a general packet radio service (GPRS), Code Division Multiple Access (CDMA), Wideband Code Division Multiple Access (WCDMA), Long Term Evolution (LTE), an email, and a short message service (SMS).

The memory 320 may be configured to store a software program and a module, and the processor 380 runs the software program and the module that are stored in the memory 320, so as to execute various functions and applications and perform data processing. The memory 320 may mainly include a program storage area and a data storage area, where the program storage area may store an operating system, an application program required by at least one function (such as a voice play function or an image play function), and the like, and the data storage area may store data (such as audio data and a phone book) created according to use of the apparatus 300 for controlling virtual machine migration, and the like. In addition, the memory 320 may include a high-speed random access memory, and may further include a non-volatile memory, for example, at least one magnetic disk storage device, a flash memory device, or another volatile solid-state storage device. Accordingly, the memory 320 may further include a memory controller to provide access of the processor 380 and the input unit 330 to the memory 320.

The input unit 330 may be configured to receive input digital or character information, and generate signal input, obtained using a keyboard, a mouse, a joystick, optics, or a trackball, related to user setting and function control. The input unit 330 may include a touch-sensitive surface 331 and another input device 332. The touch-sensitive surface 331 is also referred to as a touch display screen or a touch panel, and may collect a touch operation (such as an operation performed by a user on the touch-sensitive surface 331 or near the touch-sensitive surface 331 using any proper object or accessory, such as a finger or a stylus) performed by the user on or near the touch-sensitive surface 331, and drive a corresponding connecting apparatus according to a preset program. Optionally, the touch-sensitive surface 331 may include two parts: a touch detection apparatus and a touch controller. The touch detection apparatus detects a touch orientation of the user, detects a signal brought by the touch operation, and transfers the signal to the touch controller. The touch controller receives touch information from the touch detection apparatus, converts the touch information into contact coordinates, and sends the contact coordinates to the processor 380, and can receive and execute a command sent by the processor 380. In addition, the touch-sensitive surface 331 may be implemented using multiple types, such as a resistive type, a capacitive type, an infrared type, and a surface acoustic wave type. In addition to the touch-sensitive surface 331, the input unit 330 may further include the another input device 332. The another input device 332 may include but is not limited to one or more of a physical keyboard, a function key (such as a volume control key or a switch key), a trackball, a mouse, and a joystick.

The display unit 340 may be configured to display information input by the user or information provided for the user, and various graphical user interfaces of the apparatus 300 for controlling virtual machine migration, where the graphical user interfaces may be constituted by a graph, a text, an icon, a video, and any combination thereof. The display unit 340 may include a display panel 341. Optionally, the display panel 341 may be configured in a form such as a liquid crystal display (LCD) or an organic light-emitting diode (OLED). Further, the touch-sensitive surface 331 may cover the display panel 341. When detecting a touch operation on or near the touch-sensitive surface 331, the touch-sensitive surface 331 transfers the touch operation to the processor 380 to determine a type of a touch event, and then the processor 380 provides corresponding visual output on the display panel 341 according to the type of the touch event. In FIG. 3, the touch-sensitive surface 331 and the display panel 341 are configured as two independent parts to implement input and output functions. However, in some embodiments, the touch-sensitive surface 331 and the display panel 341 may be integrated to implement the input and output functions.

The apparatus 300 for controlling virtual machine migration may further include at least one sensor 350, such as a light sensor, a motion sensor, or another sensor. The light sensor may include an ambient light sensor and a proximity sensor, where the ambient light sensor may adjust luminance of the display panel 341 according to brightness of ambient light, and the proximity sensor may turn off the display panel 341 and/or backlight when the apparatus 300 for controlling virtual machine migration moves close to an ear. Other sensors such as a gyroscope, a barometer, a hygrometer, a thermometer, and an infrared sensor that may also be configured in the apparatus 300 for controlling virtual machine migration are not described herein.

The audio frequency circuit 360, a loudspeaker 361, and a microphone 362 may provide an audio interface between the user and the apparatus 300 for controlling virtual machine migration. The audio frequency circuit 360 may transmit, to the loudspeaker 361, an electrical signal that is obtained after conversion of received audio data, and the loudspeaker 361 converts the electrical signal into a sound signal and outputs the sound signal; in another aspect, the microphone 362 converts a collected sound signal into an electrical signal, the audio frequency circuit 360 receives and converts the electrical signal into audio data and outputs the audio data to the processor 380 to perform processing, and then the audio data is sent to, for example, another apparatus, using the RF circuit 310, or the audio data is output to the memory 320 to perform further processing. The audio frequency circuit 360 may further include a headset jack to provide communication between a peripheral headset and the apparatus 300 for controlling virtual machine migration.

WiFi belongs to a short-distance wireless transmission technology. The apparatus 300 for controlling virtual machine migration may help, using the WiFi module 370, the user send and receive an email, browse a web page, access streaming media, and the like. The WiFi module 370 provides wireless broadband Internet access for the user. Although FIG. 3 shows the WiFi module 370, it may be understood that the WiFi module 370 is not a mandatory part of the apparatus 300 for controlling virtual machine migration, and may completely be omitted as required without changing a scope of the essence of the present disclosure.

The processor 380 is a control center of the apparatus 300 for controlling virtual machine migration and is connected to each part of the entire apparatus using various interfaces and lines, and performs, by running or executing the software program and/or module that is stored in the memory 320 and invoking data stored in the memory 320, various functions of the apparatus 300 for controlling virtual machine migration, and data processing, so as to perform overall monitoring on the apparatus. Optionally, the processor 380 may include one or more processing cores. Preferably, an application processor and a modem processor may be integrated into the processor 380, where the application processor mainly processes an operating system, a user interface, an application program, and the like; and the modem processor mainly processes radio communication. It may be understood that the foregoing modem processor may also not be integrated into the processor 380.

The apparatus 300 for controlling virtual machine migration further includes the power supply 390 (such as a battery) that supplies power to each part. Preferably, the power supply may be logically connected to the processor 380 using a power supply management system, so that functions such as management of charging, discharging, and power consumption are implemented using the power supply management system. The power supply 390 may further include any component, such as one or more direct current power supplies or alternating current power supplies, a recharging system, a power supply fault detection circuit, a power converter or a power inverter, or a power status indicator.

Though not shown, the apparatus 300 for controlling virtual machine migration may further include a camera, a Bluetooth® module, and the like, which are not described herein. In this embodiment, the memory 320 of the apparatus 300 for controlling virtual machine migration stores one or more programs. The processor 380 runs the software program stored in the memory 320 to obtain information about an application running on a first virtual machine, where the first virtual machine runs on a first host; determine, according to the information about the application, whether an application associated with the application running on the first virtual machine runs on a second virtual machine, where the second virtual machine is any virtual machine running on a second host; and if no application associated with the application running on the first virtual machine runs on the second virtual machine, migrate the first virtual machine to the second host.

The information that is about the application running on the first virtual machine and that is obtained by the processor 380 includes a type of the application. The type of the application includes ordinary, double-machine, or cluster.

That the processor 380 determines whether an application associated with the application running on the first virtual machine runs on the second virtual machine includes, if the type of the application running on the first virtual machine is ordinary, the processor 380 determines that no application associated with the application running on the first virtual machine runs on the second virtual machine; and if the type of the application running on the first virtual machine is double-machine or cluster, the information about the application further includes an identifier of the application, the processor 380 determines whether an identifier, matching the identifier of the application running on the first virtual machine, of an application running on the second virtual machine exists, and if the identifier does not exist, the processor 380 determines that no application associated with the application running on the first virtual machine runs on the second virtual machine.

Before the processor 380 obtains the application running on the first virtual machine, the method further includes detecting a remaining resource amount of the second host; and when the remaining resource amount of the second host is greater than or equal to a preset threshold, triggering the step of obtaining the information about the application running on the first virtual machine.

It should be noted that, the apparatus 300 for controlling virtual machine migration according to this embodiment of the present disclosure may be further configured to implement another function of the foregoing apparatus embodiment, which is not described herein.

In this embodiment, when a processor needs to migrate a first virtual machine to a second host, it is first considered, from a hardware perspective, whether the second host satisfies a migration condition, and then it is considered, from an application perspective, whether the second host satisfies the migration condition. Only when a remaining resource amount of the second host satisfies a preset condition, and no application associated with an application running on the first virtual machine runs on all virtual machines on the second host, the first virtual machine is migrated to the second host. Therefore, different virtual machines on which an associated application runs are prevented from running on a same host after migration is performed, and reliability of an original application after the migration is performed is ensured.

Figure 4:
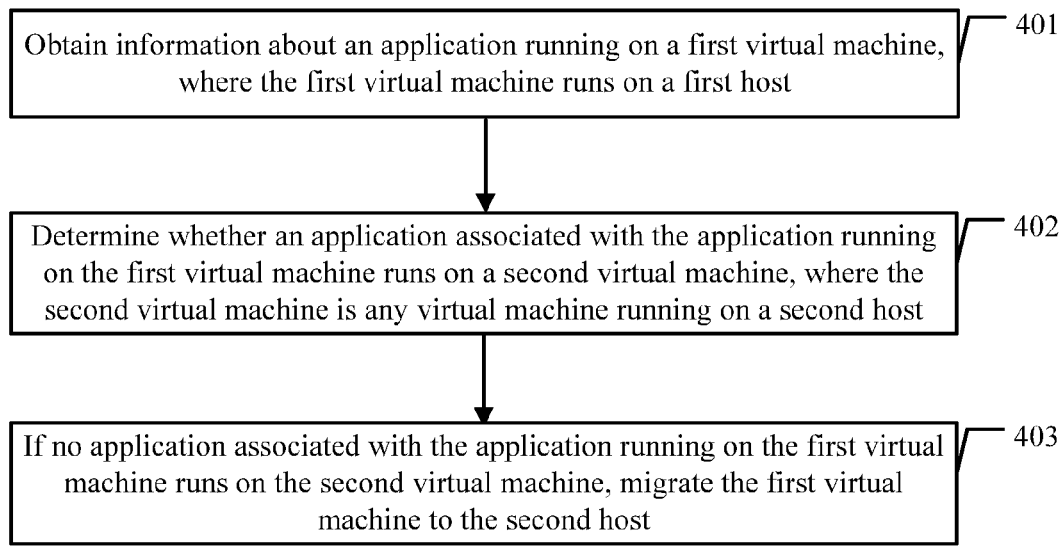
FIG. 4 is a schematic diagram of another embodiment of a method for controlling virtual machine migration according to the present disclosure.

The following describes a method for controlling virtual machine migration according to an embodiment of the present disclosure. Referring to FIG. 4, a host mentioned in an embodiment is a computer in which virtualization software is used. The computer has a virtual layer because of use of the virtualization software, and multiple virtual machines may run on one host. The host provides resources used by a virtual machine, such as a CPU and a memory, and allows that the virtual machine can access a memory and a network. The method in this embodiment includes the following steps.

Step 401: Obtain information about an application running on a first virtual machine.

In this embodiment, the first virtual machine runs on a first host, and another virtual machine may further run on the first host. Some applications may run on the first virtual machine. If an application runs on the first virtual machine, an apparatus for controlling virtual machine migration obtains the information about the application running on the first virtual machine.

Step 402: Determine, according to the information about the application, whether an application associated with the application running on the first virtual machine runs on a second virtual machine.

One or more virtual machines may run on the second host, any virtual machine running on the second host is referred to as the second virtual machine herein. That is, the first virtual machine refers to a virtual machine running on the first host, and the second virtual machine refers to any virtual machine running on the second host, where there are one or more second virtual machines. Some applications may also run on the second virtual machine. The apparatus for controlling virtual machine migration determines whether an application associated with the application running on the first virtual machine runs on the second virtual machine.

Step 403: If no application associated with the application running on the first virtual machine runs on the second virtual machine, migrate the first virtual machine to a second host.

If each application running on the second virtual machine is not associated with the application running on the first virtual machine, it indicates that after the first virtual machine is migrated to the second host, reliability of the application that originally runs on the first virtual machine is not affected by the migration. In this case, if the first host becomes faulty, or another case in which the first virtual machine needs to be migrated occurs, the first virtual machine may be migrated to the second host. If the application running on the second virtual machine is associated with the application running on the first virtual machine, it indicates that after the first virtual machine is migrated to the second host, the reliability of the application that originally runs on the first virtual machine is affected by the migration, and then the first virtual machine is rejected to be migrated to the second host.

In addition, if no application runs on the first virtual machine, the first virtual machine may be directly migrated to the second host when there is a need.

In this embodiment, before a first virtual machine is migrated to a second host, it is first determined whether an application associated with an application running on the first virtual machine runs on all virtual machines running on the second host, and if no application associated with the application running on the first virtual machine runs on all the virtual machines running on the second host, virtual machine migration is performed. Therefore, different virtual machines on which an associated application runs are prevented from running on a same host after migration is performed, and reliability of an original application after the migration is performed is ensured.

Figure 5:
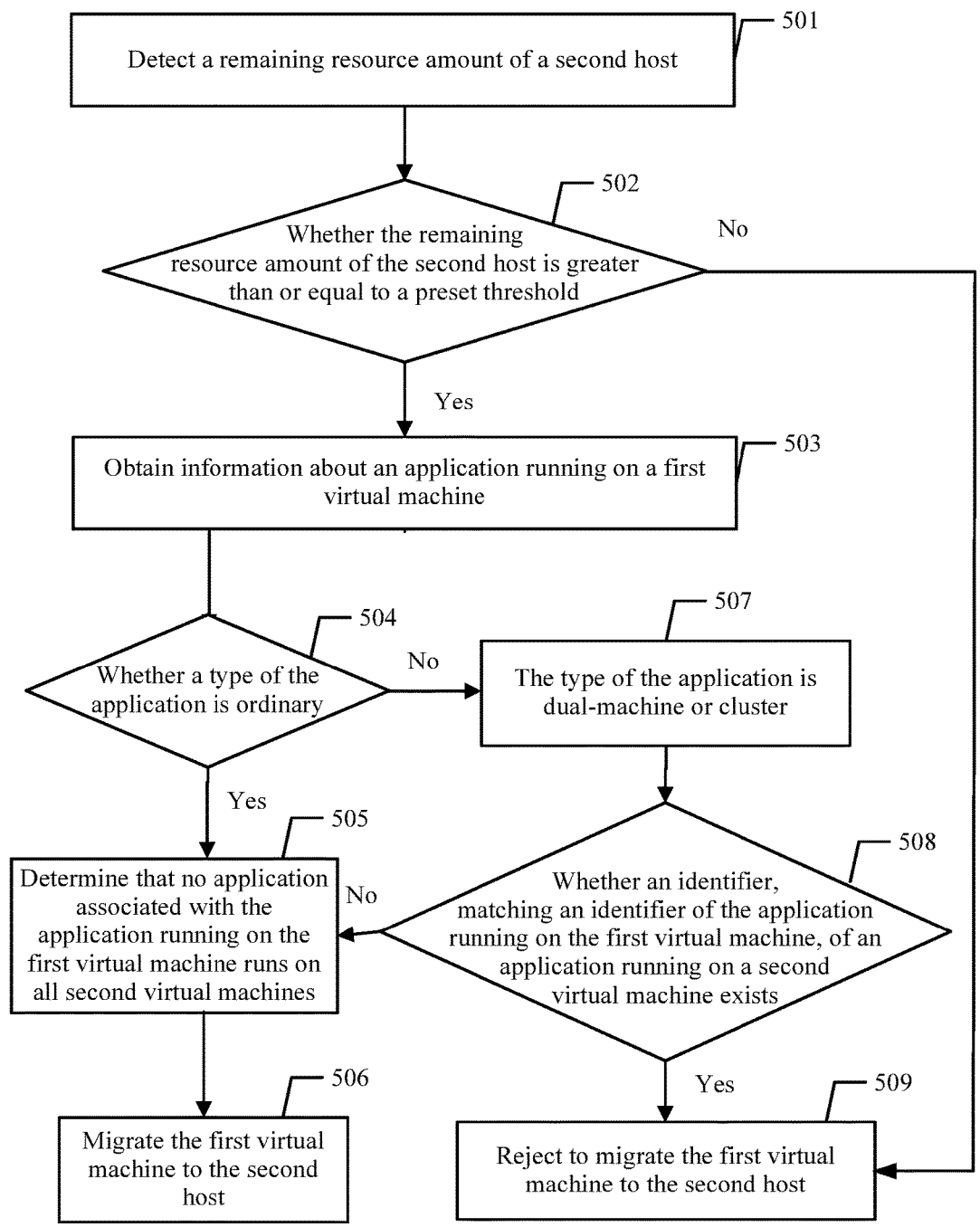
FIG. 5 is a schematic diagram of another embodiment of a method for controlling virtual machine migration according to the present disclosure.

For ease of understanding, the following describes, using a specific example, a method for controlling virtual machine migration in an embodiment of the present disclosure. Referring to FIG. 5, the method in an embodiment includes the following steps.

Step 501: Detect a remaining resource amount of a second host.

An apparatus for controlling virtual machine migration may detect a resource usage amount of the second host in real time to obtain the remaining resource amount of the second host, where the resources may include a memory, a network, and the like.

Step 502: Determine whether the remaining resource amount of the second host is greater than or equal to a preset threshold, where if the remaining resource amount of the second host is greater than or equal to the preset threshold, step 503 is executed; if the remaining resource amount of the second host is less than the preset threshold, step 509 is executed.

One or more virtual machines run on the second host, and any virtual machine running on the second host is referred to as a second virtual machine. The apparatus for controlling virtual machine migration determines whether the remaining resource amount of the second host is greater than or equal to the preset threshold, where the preset threshold may be preset by the apparatus for controlling virtual machine migration according to a resource usage amount of an application running on a virtual machine that needs to be migrated.

Step 503: Obtain information about an application running on a first virtual machine.

The first virtual machine runs on a first host. If the remaining resource amount of the second host is greater than or equal to the preset threshold, it indicates that the second host may satisfy a migration requirement of the first virtual machine from a hardware perspective. Whether the first virtual machine may be migrated to the second host further needs to be considered from an application perspective. The apparatus for controlling virtual machine migration obtains the information about the application running on the first virtual machine.

The information about the application includes a type of the application. The type of the application includes ordinary, double-machine, and cluster. In addition, when the type of the application is double-machine or cluster, the information about the application further includes an identifier of the application. The identifier of the application includes an application name, a node identifier, and the like. An application of an ordinary type exists independently, and is not associated with another application. For an application of a double-machine type, applications are associated with each other, and may be identified using an application name (used to determine whether the applications are a same double-machine application) and a node identifier (for example, Master or Slave). Initially, associated applications run on virtual machines of two different hosts. Similarly, when an application is a cluster application, applications are also associated with each other, and may be identified using an application name (used to determine whether the applications are a same cluster application) and a node identifier (for example, a Node1$d$, a Node2$d$, or a Node3$d$). Initially, associated applications run on virtual machines of multiple different hosts. For an application of a double-machine type and an application of a cluster type, it is considered that identifiers of two applications match each other only when both application names and node identifiers match each other, where the matching herein refers to being the same or corresponding.

Step 504: Determine whether a type of the application running on the first virtual machine is ordinary, where if the type of the application running on the first virtual machine is ordinary, step 505 is executed; if the type of the application running on the first virtual machine is not ordinary, step 507 is executed.

Step 505: Determine that no application associated with the application running on the first virtual machine runs on a second virtual machine.

When the type of the application running on the first virtual machine is ordinary, the application exists independently, and no application associated with the application runs on the second virtual machine, that is, migration of the first virtual machine does not affect reliability of the application.

Step 506: Migrate the first virtual machine to the second host.

When the type of the application running on the first virtual machine is ordinary, the second host may serve as a protection host of the first virtual machine running on the first host; and when the first host becomes faulty, or the first virtual machine needs to be migrated in another situation, the first virtual machine may be migrated to the second host.

Step 507: When the type of the application running on the first virtual machine is not ordinary, it may be determined that the type of the application running on the first virtual machine is double-machine or cluster.

Regardless of whether type of the application running on the first virtual machine is double-machine or cluster, when migration on the first virtual machine is being performed, a reliability problem of the application that originally runs on the first virtual machine after the migration is performed needs to be considered.

Step 508: Determine whether an identifier, matching an identifier of the application running on the first virtual machine, of an application running on the second virtual machine exists, where if the identifier exists, step 509 is executed; if the identifier does not exist, step 505 is executed.

Step 509: Reject to migrate the first virtual machine to the second host.

When an identifier of any application running on a virtual machine on the second host matches the identifier of the application running on the first virtual machine, it indicates that after the first virtual machine is migrated to the second host, different virtual machines on which an associated application runs run on the second host. Migrating the first virtual machine to the second host affects the reliability of the application that originally runs on the first virtual machine. Considering from an application perspective, the second host is not suitable for serving as a protection host of the first virtual machine. The apparatus for controlling virtual machine migration rejects to migrate the first virtual machine to the second host.

The following provides description using an example of an actual application, which is shown in the following table:

| Host | Virtual machine | Application type | Node identifier |
|---|---|---|---|
| First host | Virtual machine A1 | Ordinary | / |
| | Virtual machine A2 | Cluster | Node1d |
| Second host | Virtual machine B1 | Cluster | Node2d |
| | Virtual machine B2 | Double-machine | Slave |

The virtual machine A1 and the virtual machine A2 run on the first host, and the virtual machine B1 and the virtual machine B2 run on the second host. Assuming that only one application runs on each virtual machine, and a type of an application running on the virtual machine A1 is ordinary, when a remaining resource amount of the second host satisfies a preset condition, the second host may serve as a protection host of the virtual machine A1; and when there is a need, the virtual machine A1 may be migrated to the second host. When a type of an application running on the virtual machine A2 is cluster, and a type of an application running on the virtual machine B1 is also cluster, assuming that the two applications are a same cluster application, that is, names of the two applications are the same, the node identifier Node2d matches the node identifier Node1d, that is, an application associated with the application running on the virtual machine A2 runs on the virtual machine B1 running on the second host. In this case, the second host cannot serve as a protection host of the virtual machine A2, and an apparatus for controlling virtual machine migration rejects to migrate the virtual machine A2 to the second host.

In this embodiment, when an apparatus for controlling virtual machine migration needs to migrate a first virtual machine to a second host, whether the second host satisfies a migration condition is considered from a hardware perspective, and whether the second host satisfies the migration condition is also considered from an application perspective. Only when a remaining resource amount of the second host satisfies a preset condition, and no application associated with an application running on the first virtual machine runs on all virtual machines on the second host, the first virtual machine is migrated to the second host. Therefore, different virtual machines on which an associated application runs are prevented from running on a same host after migration is performed, and reliability of an original application after the migration is performed is ensured.

In addition, it should be noted that in the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. An apparatus for controlling virtual machine migration, comprising:
   a memory; and
   a processor coupled to the memory and configured to:
   detect a remaining resource amount of a second host;
   determine whether the remaining resource amount of the second host is greater than or equal to a preset threshold;
   reject to migrate a first virtual machine to the second host when the remaining resource amount of the second host is less than to the preset threshold;
   obtain information about an application running on the first virtual machine when the remaining resource amount of the second host is greater than or equal to the preset threshold, the first virtual machine running on a first host, and the information about the application including an application type comprising ordinary, double-machine, or cluster;

determine, according to the information about the application, whether an application associated with the application running on the first virtual machine runs on a second virtual machine, the second virtual machine being any virtual machine running on the second host;

migrate the first virtual machine to the second host when no application associated with the application running on the first virtual machine runs on the second host when the application type is ordinary;

determine whether an identifier, matching an identifier of the application running on the first virtual machine when the application type is double-machine or cluster, of an application running on the second virtual machine exists;

reject to migrate the first virtual machine to the second host when the identifier exists;

determine that no application associated with the application running on the first virtual machine runs on a second virtual machine when the identifier does not exist; and migrate the first virtual machine to the second host when no application associated with the application running on the first virtual machine runs on the second host when the identifier does not exist.

2. A method for controlling virtual machine migration, comprising:

detecting a remaining resource amount of a second host;

determining whether the remaining resource amount of the second host is greater than or equal to a preset threshold;

rejecting to migrate a first virtual machine to the second host when the remaining resource amount of the second host is less than to the preset threshold;

obtaining information about an application running on the first virtual machine when the remaining resource amount of the second host is greater than or equal to the preset threshold, the first virtual machine running on a first host, and the information about the application including an application type comprising ordinary, double-machine, or cluster;

determining, according to the information about the application, whether an application associated with the application running on the first virtual machine runs on a second virtual machine, the second virtual machine being any virtual machine running on the second host; and migrating the first virtual machine to the second host when no application associated with the application running on the first virtual machine runs on the second virtual machine when the application type is ordinary;

determining whether an identifier, matching an identifier of the application running on the first virtual machine when the application type is double-machine or cluster, of an application running on the second virtual machine exists;

rejecting to migrate the first virtual machine to the second host when the identifier exists;

determining that no application associated with the application running on the first virtual machine runs on a second virtual machine when the identifier does not exist; and migrating the first virtual machine to the second host when no application associated with the application running on the first virtual machine runs on the second host when the identifier does not exist.

* * * * *